United States Patent [19]

Brown

[11] 4,371,182

[45] Feb. 1, 1983

[54] VEHICLE SUSPENSION SYSTEM

[75] Inventor: Peter W. Brown, Leicestershire, England

[73] Assignee: Lucas Industries Limited, Birmingham, England

[21] Appl. No.: 232,688

[22] Filed: Feb. 9, 1981

[30] Foreign Application Priority Data

Mar. 5, 1980 [GB] United Kingdom ............... 8007465

[51] Int. Cl.³ .......................................... B60G 13/08
[52] U.S. Cl. ................................. 280/6 H; 280/6.1; 280/714
[58] Field of Search ............... 280/6 H, 6 R, 714, 6.1, 280/6.11; 267/64.16, 64.17; 180/41

[56] References Cited

U.S. PATENT DOCUMENTS

| | | | |
|---|---|---|---|
| 3,778,081 | 12/1973 | Takahashi | 280/714 |
| 3,881,736 | 5/1975 | Wilfert | 280/6.1 |
| 3,884,496 | 5/1975 | Ito | 280/6 H |
| 3,917,295 | 11/1975 | Hiruma | 280/6 H |

*Primary Examiner*—Robert R. Song
*Attorney, Agent, or Firm*—Scrivener, Clarke, Scrivener and Johnson

[57] ABSTRACT

A motor vehicle suspension system comprises four hydro-pneumatic struts three of which are provided with sensors to detect variations in length of the struts. A control system is responsive to the sensors and operates valves to add fluid to or remove fluid from struts to maintain the length of these struts constant. The pressure within the fourth strut is controlled so that the proportion of the static roll-torque (caused by off-center loading of the vehicle) which is reacted by the front and rear axles is the same as the proportion of the static weight of the vehicle which is reacted by the front and rear axles respectively. Control of the pressure within the fourth strut is accomplished by a control valve having a valve spool which is subject to the pressures within the four struts.

7 Claims, 5 Drawing Figures

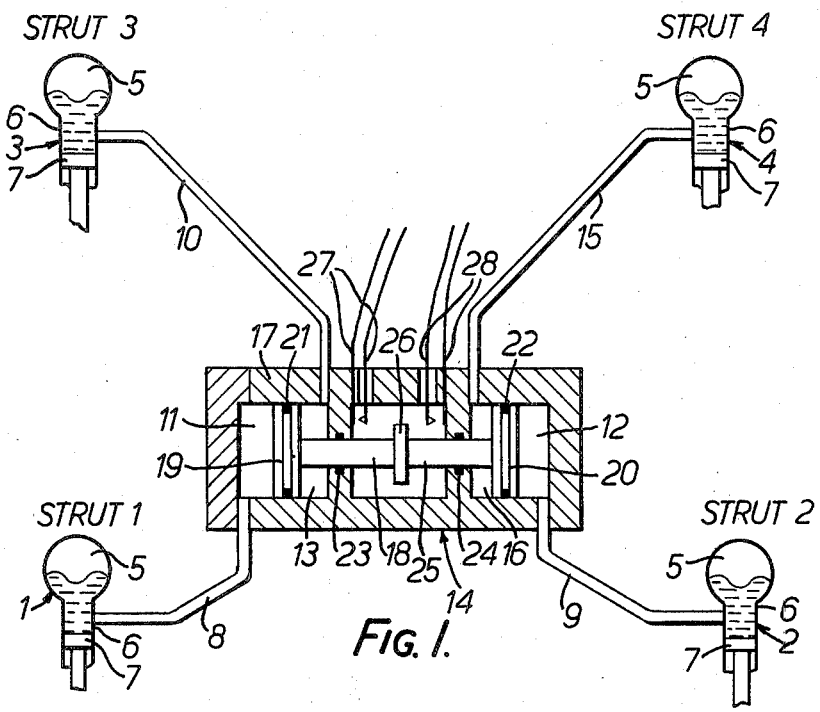
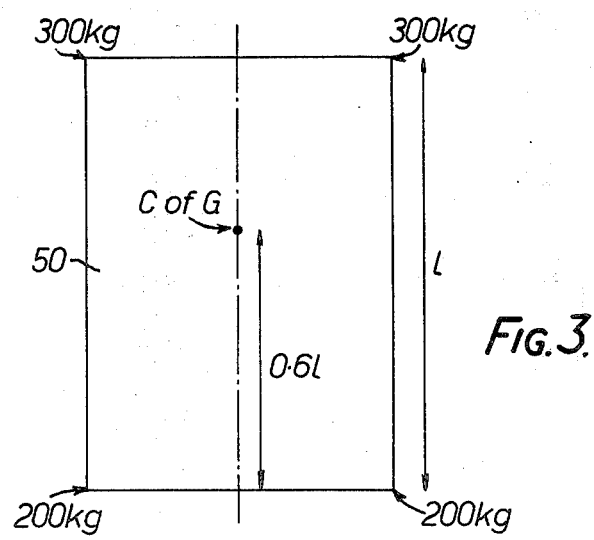

VEHICLE SUSPENSION SYSTEM

This invention relates to a vehicle suspension system.

In designing a motor vehicle it is common to calculate what percentage of the total weight of the vehicle should ideally be carried by the front and rear axles of the vehicle respectively, and then to design the vehicle such that the weight distribution is as near as practicable to the calculated optimum value.

For example, in the case of a front wheel drive vehicle this may result in 60% of the weight of the vehicle being supported on the front axle, and 40% to be supported on the rear axle. In this case, weight distribution of components within the vehicle is arranged so that the centre of gravity of the vehicle is 0.6 times the distance between the front and rear-axles from the rear axle.

The proportion of the weight of the vehicle supported on each axle will be determined solely by the distance of the centre of gravity of the vehicle from the respective axles. However, the weight supported on each wheel of each axle will be determined by the location of the centre of gravity of the vehicle relative to the longitudinal centre line of the vehicle. In an unladen vehicle the centre of gravity of the vehicle will in general lie substantially on the longitudinal centre line of the vehicle, and accordingly the total weight carried by each axle of the vehicle will be equally shared between the two wheels of that axle. If, however, the vehicle is loaded asymmetrically relative to the longitudinal centre line of the vehicle, the centre of gravity of the loaded vehicle will be offset to one side of the longitudinal centre line. If for example the vehicle is loaded with a driver and a rear seat passenger both of whom sit on the offside of the vehicle, the centre of gravity of the loaded vehicle will be offset to the offside of the longitudinal centre line. This transverse offset of the centre of gravity of a loaded vehicle from the longitudinal centre line may be considered as imposing a static "roll-torque" on the front and rear axles of the vehicle. This torque has the effect of disturbing the weight distribution on each axle so that one wheel of the axle will be more highly loaded than the other wheel. In the example cited above where the centre of gravity of the vehicle is offset to the offside of the longitudinal centre line, the offside wheel of the front axle will carry a higher load than the nearside wheel of the front axle, and similarly the offside wheel of the rear axle will carry a higher load than the nearside wheel of the rear axle.

However, the proportion of the static roll-torque which is carried by the front and rear axles respectively of the vehicle will be determined by the relative roll stiffnesses of the two axles. Generally, the roll stiffnesses of the axles will be determined by other criteria of the suspension design, and accordingly the distribution of the static roll-torque will be predetermined. It will not, accordingly, be possible to arrange the distribution of the roll-torque between the axles in a desired manner.

It is to be understood that the term "axle" as used herewith is intended to cover not only conventional rigid axles, but also other means for connecting vehicle wheels to a vehicle body. In general, the "front axle" of a vehicle may be considered to be a rigid member, real or imaginary, which interconnects the hubs of the front wheels of the vehicle, and similarly the "rear axle" can be considered to be a rigid member which interconnects the hubs of the rear wheels of a vehicle. Such front and rear axles, being rigidly connected to the vehicle wheels, constitute the unsprung parts of the vehicle suspension system, and are connected to the vehicle body by means of elastic members which will herein be referred to as "springs".

According to one feature of the present invention there is provided a vehicle suspension system for a vehicle having four ground engaging wheels, the suspension system comprising: a variable length suspension strut for each of said ground engaging wheels; detector means for detecting departure of the vehicle body from a datum zone which is fixed relative to a datum plane defined by three points on the unsprung portions of the vehicle suspension; means responsive to said detector means for controlling the effective length of three of said struts to restore the vehicle body to the datum zone; and means for adjusting the force exerted by the fourth strut to such a value that for any loading of the vehicle the ground reaction of the wheel associated with the fourth strut satisfies the condition:

$$R_4 = R_3 + k(R_2 - R_1)$$

where
$R_4$ = ground reaction of the wheel associated with the fourth strut
$R_3$ = ground reaction of the other wheel at the same end of the vehicle as the wheel associated with the fourth strut
$R_2$ = ground reaction of the other wheel at the same side of the vehicle as the wheel associated with the fourth strut
$R_1$ = ground reaction of the wheel diametrically opposed to the wheel associated with the fourth strut
$k$ = a constant With a preferred embodiment of the invention the difference in ground reaction between the wheels of the front axle is always a fixed proportion of the difference in the ground reaction between the wheels of the rear axle, regardless of the weight distribution within the vehicle. In other words, static roll-torque induced by off-centre loading of the vehicle will be reacted by the front and rear axles in a fixed ratio, regardless of the distribution of loading within the vehicle. By adjusting the force exerted by the fourth suspension strut in the manner defined above the constant of proportionality can be fixed independently of the roll stiffnesses of the front and rear axles.

In the preferred embodiment of the invention the constant of proportionality (k) is chosen such that the distribution of static roll-torque between the front and rear axles is substantially the same as the ratio of distribution of static weight between the front and rear axles. In a particularly preferred embodiment, the distribution of static weight between the front and rear axles is such that 60% of the weight is supported by the front axle, and similarly the constant of proportionality (k) is such that 60% of the static roll-torque is supported by the front axle.

In the preferred embodiment of the invention the suspension struts are each hydro-pneumatic struts. With such struts, for a constant loading the length of a strut may be increased or decreased by respectively adding or removing fluid from the strut, and for a constant length of strut the force exerted by the strut can be similarly increased or decreased by adding or removing fluid from the strut.

Preferably, the two struts associated with the rear axle of the vehicle are "self-levelling" that is to say are each provided with detectors which operate control valves to maintain the effective length of the struts constant despite changing the loads imposed on the strut. The said fourth strut and the third strut are then located on the front axle. The third strut may be a self-levelling strut similar to those used on the rear axle, in which case it will be provided with a detector which controls valve means for ensuring that the strut remains of constant length. In this case, the three points defining the datum plane may be considered to be the three points interconnecting the first, second and third struts to the unsprung portions of the vehicle suspension. In the alternative, the detector associated with the front axle may be remote from the third strut in which case the three points defining the datum plane will be the interconnections between the rear axle struts and the unsprung portions of the rear axle together with a reference point on the front axle.

In the preferred embodiment in which hydropneumatic struts are used the ground reaction at each wheel will be proportional to the pressure in the strut associated with that wheel, and accordingly the ground reaction at the wheel associated with the fourth strut may conveniently be selected by setting the pressure in the fourth strut to a value determined by the pressure in the three remaining struts.

Preferably, means will be provided for disabling the control arrangement of the present invention to prevent response to variations in dynamic roll-torque of the vehicle induced during movement. In the alternative, the response time of the system can be made sufficiently long to obviate the effects of short-term dynamic roll-torques and/or a sensor can be provided to render the system inactive when the vehicle is subject to dynamic roll-torques above a predetermined value for longer than a predetermined length of time.

The above and further features and advantages of the present invention will become clear from the following description of a preferred embodiment thereof, given by way of example only, reference being had to the accompanying drawings, wherein:

FIG. 1 is a schematic representation of an embodiment of suspension system according to the present invention;

FIGS. 3–5 illustrate a numerical example of the operation of a suspension system.

Figure 2:
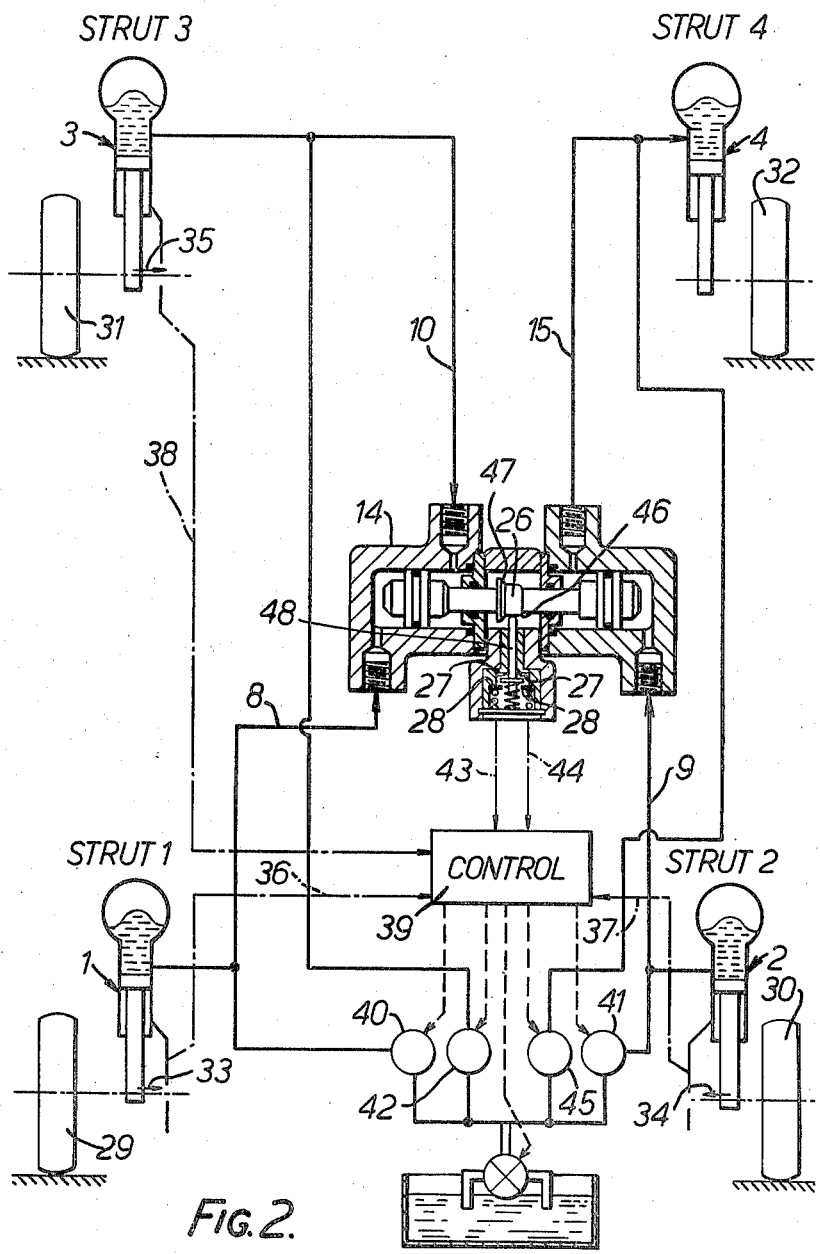
FIG. 2 is a diagrammatic illustration of a practical embodiment of the suspension system shown in FIG. 1.

Referring firstly to FIG. 1 there is shown schematically a suspension system comprising four hydropneumatic suspension struts 1,2,3,4. The struts each comprise a trapped mass of gas 5 and a hydraulic cylinder 6 in which works a piston 7 connected to the output rod of the strut. Struts 1,2 and 3 are height controlled, that is to say each is provided with a sensor which controls a valve operative to admit or remove hydraulic fluid from the strut such that the overall effective length of the strut remains constant despite variations in loading of the struts.

Pipes 8,9 and 10 connect the struts 1,2,3 to respective chambers 11,12,13 of a control valve 14. A further pipe 15 connects the fourth strut 4 to a further chamber 16 of the valve 14.

The valve 14 comprises a valve body 17 in which is slidably mounted a spool 18 provided at each end with a respective piston 19,20. The pistons 19,20 are provided with respective seals 21,22 which slidingly engage the walls of the body 17. Similarly, seals 23 and 24 slidingly engage the piston rod 25 which interconnects the pistons 19,20.

A flange 26 is provided at the centre of the rod 25 and is positioned to close either a first pair of contacts 27, or a second pair of contacts 28 if the spool moves out of a central zone on the body 17. Closure of the contacts 27 by the flange 26 causes the operation of a valve to add hydraulic fluid to the strut 4, whilst closure of the contacts 28 by the flange 26 causes operation of a valve to allow hydraulic fluid to leave the strut 4.

It will be appreciated that the pressure subsisting in each of the struts 1,2,3,4 is proportional to the ground reaction at each of the associated wheels, the constant of proportionality being determined by the dimensions of the respective cylinders 6. If we assume for the purposes of illustration that the dimensions of the struts 1,2,3,4 are identical, the reaction at each of the associated wheels will be:

$$R_1 = mP_1 \qquad\qquad (i)$$

$$R_2 = mP_2 \qquad\qquad (ii)$$

$$R_3 = mP_3 \qquad\qquad (iii)$$

$$R_4 = mP_4 \qquad\qquad (iv)$$

where:
$R_1, R_2, R_3$, and $R_4$ are the reactions at the four wheels associated with struts 1 to 4 respectively
$P_1, P_2, P_3$, and $P_4$ are the pressures in the four struts 1 to 4 respectively
m is a constant
If the area of pistons 19,20 is $a_1$ and the area of piston rod 25 is $a_2$ the spool 18 will be in equilibrium when:

$$a_1 P_1 + (a_1 - a_2)P_4 = (a_1 - a_2)P_3 + a_1 \cdot P_2$$

i.e. when $$P_4 = P_3 + [a_1/(a_1 - a_2)](P_2 - P_1) \qquad (V)$$

It will be appreciated that the positioning of the contacts 27,28 ensures that the pressure within the strut 4 will be adjusted such that this equilibrium condition is always satisfied.

Subsisting equations (i) to (iv) into equation (v) and cancelling m throughout we have:

$$R_4 = R_3 + [a_1/(a_1 - a_2)](R_2 - R_1)$$

Thus, the control valve 14 ensures that the required ratio of distribution of static roll-torque between the front and rear axles is always achieved, regardless of loading of the vehicle. The constant of proportionality k referred to above is equal to $a_1/(a_1 - a_2)$, i.e. is solely dependent on the area of the pistons 19,20 and piston rod 25, and can accordingly be set at any desired value by suitable design of the valve 14.

Referring now to FIG. 2, a practical embodiment of the invention is illustrated diagramatically. This embodiment of the invention is particularly suitable for a light motor car having rear wheels 29 and 30 associated with struts 1 and 2 respectively, and front wheels 31 and 32 associated with struts 3 and 4 respectively. The struts 1,2 and 3 are provided with respective sensors 33–35 which supply signals along respective lines 36-38 to a central control box 39 when the length of the struts 1-3 departs from a datum value. Upon receiving signals from one of the sensors 33-35 the control box operates an appropriate control valve 40,41,42 such that fluid is supplied to or is removed from the strut associated with activating sensor whereby the effective length of the strut is returned to within predetermined limits. In effect, the control box 39 is effective to maintain the position of the body work mounted on the struts 1,2,3 within a datum zone which is fixed relative to a datum plane defined by the sensors 33-35. The size of the zone is determined by the dead-band of each sensor, i.e. the range of positions of the sensor which will produce a nil output. Such a dead band may typically be in the region of 1 cm long for each strut, and accordingly, the datum zone is such that the vehicle body position may vary by up to a centimeter relative to the datum plane whilst the body remains in the datum zone. If, due to loading of the vehicle one or more of the struts 1,2 or 3 is compressed or extended such that the sensors 33,34 or 35 pass outside their respective dead-bands the control box 39 will adjust the length of the struts 1,2 or 3 to re-level the vehicle body as necessary.

The control valve 14 is operative to send signals to the control box 39 along lines 43 or 44 when a variation in the pressure within the strut 4 is necessary to satisfy equation (V) above. In response to a signal on line 43 or 44 the control box operates a valve 45 associated with the strut 4 to admit additional fluid to the strut 4 and thereby increase the pressure within the strut, or to withdraw fluid from the strut 4, and accordingly allow the pressure within the strut to decrease.

It will be noted that the flange 26 is shown in FIG. 2 as having two ramp surfaces 46 and 47 conncted by a dead-band. A probe 48 is biased to rest against the flange 46, and closes contacts 28 when forced downwardly (as view in FIG. 2) by the ramp surface 47. The contacts 27 are closed when the probe 48 moves upwardly along ramp surface 46.

Whilst in the preferred embodiment of the invention the sensors for controlling the levelling of struts 1-3 are located at the struts themselves, one or more of these sensors may be located remotely from its associated strut. For example, the sensors 33,34 may be positioned as illustrated adjacent the struts of the rear wheels of the vehicle, whilst the sensor 35 is located in the centre of the front of the vehicle and is operative to sense the distance between the vehicle body and a reference point at the unsprung parts of the vehilce suspension. In any event, the control box 39 is operative to control the struts 1-3 such that the vehicle body will always be located within a datum zone which is fixed relative to a datum plane determined by the position of the sensors on the unsprung part of the vehicle suspension. It may be noted that the relative dimensions of the pistons 19,20 and the piston rod 25 shown in FIG. 2 ensure that the static roll torque imposed on the body is distributed in the ratio of 56% to the front wheels of the vehicle and 44% to the rear wheels of the vehicle. By appropriately varying the dimensions of the pistons and/or the piston rod the distribution of static roll-torque can be altered to any desirable value.

Figure 4:
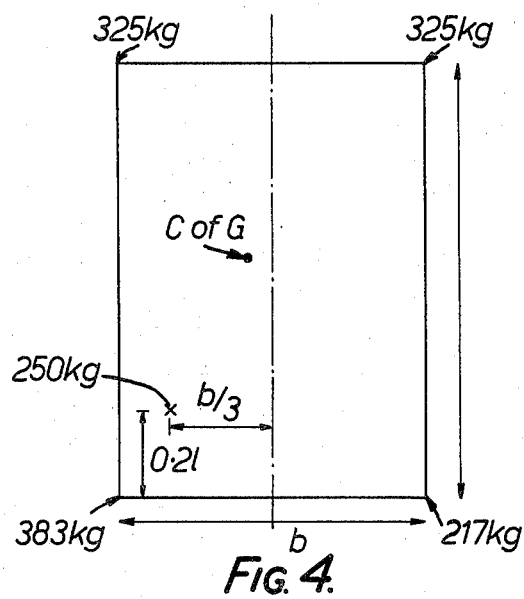
Figure 5:
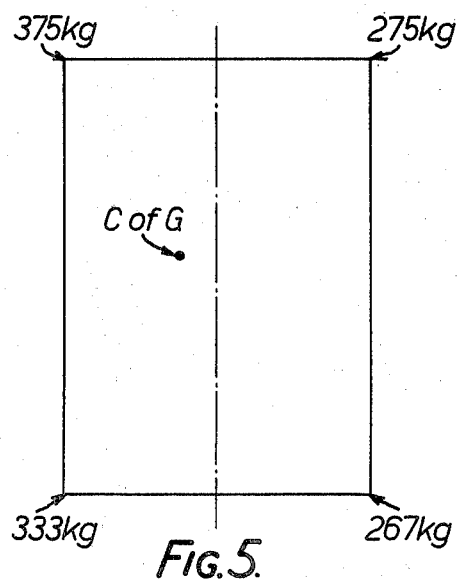

Turning now to FIGS. 3-5 a numerical example of the operation of the system of FIG. 2 is shown.

In this example the vehicle 50 has an unladened weight of 1000 kg distributed in the ratio of 60:40 between the front and rear wheels of the vehicle. The centre of gravity of the vehicle is located on the longitudinal centre line of the vehicle 0.6 l from the rear axle, where l is the length of the vehicle. Accordingly, each front wheel supports a weight of 300 kg and each rear wheel supports a weight of 200 kg. For convenience, the wheels are illustrated as being located at the corners of the vehicle. Referring now to FIG. 4 the vehicle has been loaded with a weight of 250 kg displaced ⅓ b from the centre line of the vehicle and 0.2 l from the rear axle of the vehicle, where b is the width of the vehicle. The addition of the 250 kg load will displace the centre of gravity of the vehicle to one side of the centre line of the vehicle, and will accordingly introduce a static roll-torque which must be reacted by the front and rear axles of the vehicle. By calculation, the total static roll-torque to be reacted is approximately 83 b. In addition, the static weight of the vehicle (1250 kg) must also be supported, and by calculation it can be shown that the front wheels of the vehicle must support a total of 650 kg and the rear wheels must support a weight of 600 kg.

If the vehicle was not fitted with an embodiment of the invention and the rear axle had a very high roll stiffness whilst the front axle had a very low roll stiffness, substantially the entire static roll-torque would be supported by the rear axle of the vehicle, and the ground reaction of the four wheels of the vehicle will be as shown in FIG. 4. Such a distribution of ground reactions would clearly have an adverse effect on the handling of the vehicle.

If as an example of operation of the invention a system is fitted in which the control valve provides a 60:40 distribution of static roll-torque between the front and rear axles of the vehicle, the static ground reaction on each wheel of the vehicle will be as shown in FIG. 5. It will be noted in FIG. 5 that the total static weight supported by the front wheels is still 650 kg, and the total static weight supported by the rear wheels is still 600 kg. However, the static roll-torque applied to the front wheels of the vehicle is 50 b and the static roll-torque applied to rear wheels of the vehicle is 33 b i.e. the static roll-torque is divided between the front and rear axles of the vehicle in the ratio of 60:40 but remains in total equal to 83 b.

It will further be appreciated that by suitable design of the valve 14 the distribution of static roll-torque between the front and rear wheels of the vehicle may be set at any value selected to provide desirable handling characteristics for the vehicle.

I claim:

1. A vehicle suspension system for a vehicle having four ground engaging wheels, the suspension system comprising: a variable length suspension strut for each of said ground engaging wheels; detector means for detecting departure of the vehicle body from a datum zone which is fixed relative to a datum plane defined by three points on the unsprung portions of the vehicle suspension; means responsive to said detector means for controlling the effective length of three of said struts to restore the vehicle body to the datum zone; and means for adjusting the force exerted by the fourth strut to such a value that for any loading of the vehicle the ground reaction of the wheel associated with the fourth strut satisfies the condition:

$$R_4 = R_3 + k(R_2 - R_1)$$

where $R_4$ = ground reaction of the wheel associated with the fourth strut $R_3$ = ground reaction of the other wheel at the same end of the vehicle as the wheel associated with the fourth strut $R_2$ = ground reaction of the other wheel at the same side of the vehicle as the wheel associated with the fourth strut $R_1$ = ground reaction of the wheel diametrically opposed to the wheel associated with the fourth strut k = a constant.

2. A vehicle suspension system according to claim 1 wherein the constant (k) is such that the distribution of static roll-torque between the front and rear axles of the vehicle is in substantially the same ratio as the distribution of static weight between the front and rear axles.

3. A vehicle suspension system according to claim 2 wherein substantially 60% of the static weight of the vehicle and of the static roll-torque is supported by the front axle of the vehicle.

4. A vehicle suspension system according to any preceding claim wherein the detector means comprises a respective detector for each of the said three struts, each detector being operative to emit a signal when the effective length of its associated strut lies outside a predetermined range, and wherein the means for controlling the effective length of the said three struts comprises means operative in response to signals emitted by the said detectors for returning the effective length of each strut to a value lying within the said predetermined range for that strut.

5. A vehicle suspension system according to claims 1 through 3 wherein the suspension struts are each hydropneumatic struts.

6. A vehicle suspension system according to claim 5 wherein the means for adjusting the force exerted by the fourth strut comprises means for setting the fluid pressure within the fourth strut to a value determined by the fluid pressure within the three remaining struts.

7. A vehicle suspension system according to claim 6 wherein the means for adjusting the force exerted by the fourth strut comprises: a valve having a valve body in which is slidably mounted a valve spool, the valve spool being biased in one direction by the pressure subsisting within the fourth strut and by the pressure subsisting within the strut diametrically opposed on the vehicle to the fourth strut and being biased in the opposite direction by the pressure subsisting within the two remaining struts; and means responsive to movement of the valve spool as a result of imbalance of forces due to the fluid pressures acting thereon to change the pressure within the fourth strut to correct said imbalance.

* * * * *